(12) United States Patent
Bosshard et al.

(10) Patent No.: US 9,306,293 B2
(45) Date of Patent: *Apr. 5, 2016

(54) ANTENNA AND MULTI-BEAM ANTENNA SYSTEM COMPRISING COMPACT FEEDS AND SATELLITE TELECOMMUNICATION SYSTEM COMPRISING AT LEAST ONE SUCH ANTENNA

(71) Applicant: THALES, Neuilly-sur-Seine (FR)

(72) Inventors: Pierre Bosshard, Tournefeuille (FR); Philippe Lepeltier, Castanet Tolosan (FR); Judicael Pressense, Toulouse (FR); Bernard Charrat, Toulouse (FR)

(73) Assignee: THALES, Courbevoie (FR)

( * ) Notice: Subject to any disclaimer, the term of this patent is extended or adjusted under 35 U.S.C. 154(b) by 414 days.

This patent is subject to a terminal disclaimer.

(21) Appl. No.: 13/945,804

(22) Filed: Jul. 18, 2013

(65) Prior Publication Data

US 2014/0022137 A1     Jan. 23, 2014

(30) Foreign Application Priority Data

Jul. 20, 2012  (FR) ...................................... 12 02060

(51) Int. Cl.
*H01Q 21/28* (2006.01)
*H01Q 1/28* (2006.01)
*H01Q 25/00* (2006.01)

(52) U.S. Cl.
CPC ................. *H01Q 21/28* (2013.01); *H01Q 1/28* (2013.01); *H01Q 25/007* (2013.01)

(58) Field of Classification Search
CPC ..... H01Q 21/29; H01Q 19/136; H01Q 19/17; H01Q 21/064; H01Q 13/0258; H01Q 25/007; H01Q 1/288
USPC ............................ 343/776, 778, 836; 342/358
See application file for complete search history.

(56) References Cited

U.S. PATENT DOCUMENTS

| | | | | |
|---|---|---|---|---|
| 4,236,161 A | * | 11/1980 | Ohm | .................... H01Q 25/007 342/352 |
| 6,107,897 A | * | 8/2000 | Muhlhauser | ....... H01Q 13/0258 333/135 |
| 6,157,811 A | | 12/2000 | Dent | |
| 6,201,508 B1 | * | 3/2001 | Metzen | .............. H01Q 13/0258 343/776 |
| 6,374,104 B1 | | 4/2002 | Croq et al. | |
| 2004/0108961 A1 | * | 6/2004 | Hay | ..................... H01Q 25/007 343/781 CA |
| 2005/0088356 A1 | * | 4/2005 | Lenormand | ............ H01Q 19/17 343/781 R |
| 2005/0219126 A1 | * | 10/2005 | Rebeiz | ................. H01Q 25/007 343/700 MS |
| 2010/0052987 A1 | * | 3/2010 | Weinstein | .............. H01Q 19/19 342/372 |
| 2011/0267251 A1 | * | 11/2011 | Mathews | ............... H01Q 1/288 343/779 |
| 2012/0075149 A1 | | 3/2012 | Palacin et al. | |

FOREIGN PATENT DOCUMENTS

| | | |
|---|---|---|
| EP | 0224917 A1 | 6/1987 |
| EP | 2429036 A1 | 3/2012 |
| FR | 2765421 A1 | 6/1997 |

* cited by examiner

*Primary Examiner* — Hoang V Nguyen
*Assistant Examiner* — Michael Bouizza
(74) *Attorney, Agent, or Firm* — Baker & Hostetler LLP

(57) ABSTRACT

A multi-beam antenna comprises an array of feeds illuminating a reflector, the feeds being associated in a plurality of groups. Each feed comprises a polarizer, two diplexers and four ports operating in four different colours. All the feeds belonging to the same group comprise first ports having the same first colour, or second ports having the same second colour, linked together to form a first beam and third ports having the same third colour, or fourth ports having the same fourth colour, linked together to form a second beam.

9 Claims, 5 Drawing Sheets

ANTENNA AND MULTI-BEAM ANTENNA SYSTEM COMPRISING COMPACT FEEDS AND SATELLITE TELECOMMUNICATION SYSTEM COMPRISING AT LEAST ONE SUCH ANTENNA

CROSS-REFERENCE TO RELATED APPLICATION

This application claims priority to foreign French patent application No. FR 1202060, filed on Jul. 20, 2012, the disclosure of which is incorporated by reference in its entirety.

FIELD OF THE INVENTION

The present invention relates to an antenna and a multi-beam antenna system with a plurality of feeds per beam MFPB (Multiple Feed Per Beam Antenna) comprising compact feeds and a satellite telecommunication system comprising at least one such antenna. It applies notably to the field of satellite telecommunications and in particular to the optimization of the resources of a satellite by frequency reuse in a so-called four-colour scheme.

The multi-beam antennas considered consist of at least one reflector, for example an asymmetrical paraboloid with power supply offset relative to the radiated beams, called paraboloid offset, and an array of primary feeds placed at the focus of the reflector. Each primary feed consists of a radiating element, for example of horn type or of any other known type, and a radiofrequency RF subsystem supplying the radiating element.

BACKGROUND

In the conventional case, the radiofrequency subsystem comprises two output ports and each feed of the focal array has a corresponding thin beam radiated by the antenna and an area of coverage on the ground called spot. It is possible to obtain a radiation from the antenna by multiple beams if the individual beams are decoupled from one another, the decoupling being able to be spatial or obtained by the use of orthogonal polarizations or of different frequencies between two adjacent beams. The geometrical laws that make it possible to project the desired terrestrial coverages into the focal plane of the antenna and correctly position the phase centre of each primary feed corresponding to each spot. When the coverage is made up of spots evenly arranged on the ground, the difference between two adjacent spots directly imposes the space separating two adjacent feeds in the focal plane.

The creation of a large number of contiguous fine beams entails producing an antenna comprising a large number of individual radiating elements, placed in the focal plane of a parabolic reflector. In the case of a conventional antenna in SFPB (Single Feed Per Beam) configuration corresponding to one feed per beam, the volume allocated for the placement of a radiofrequency RF subsystem responsible for handling the transmission and reception functions in circular bipolarization mode is bounded by the radiative surface area of a radiating element.

In this configuration where each feed, consisting of a radiating element coupled to a radiofrequency subsystem comprising a transmission port and a reception port, generates a beam, each beam formed is transmitted for example by a dedicated horn constituting the individual radiating element and the radiofrequency subsystem handles, for each beam, the transmission/reception functions in single-polarization mode in a frequency band chosen according to the needs of the users. To obtain a good spot radiation efficiency, the horns of the radiating arrays must benefit from sufficient space enabling them to be sufficiently directional in order to light up the edge of the reflectors with sufficiently low levels and thus make it possible to limit the losses by spill-over. Since the spots are interleaved, the space between two feeds of an antenna may not be compatible with the physical dimensions of the horns to achieve the desired radiofrequency performance levels. For example, such is the case for spot sizes less than 1°. To resolve this problem, a choice is generally made to use three or four different antennas which each produce a third, or respectively a quarter, of the coverage. Thus, two adjacent spots of the coverage are not produced by the same antenna. When there is no constraint on the arrangement of the antenna array, this configuration generally makes it possible to obtain very effective antenna performance levels. However, when the diameter of the beams decreases, the geometrical constraints increase and it is not possible to have sufficient space to locate each horn despite the fact that the coverage is shared over three or four antennas. For very fine spots with a size of between 0.2° and 0.4°, the space allocated to each feed of the focal array becomes very small and the reflector is seen by each feed of the focal array at a subtended angle that does not permit the feeds to produce sufficient directivity to avoid the losses by spill-over.

A second antenna configuration that makes it possible to generate a large number of contiguous fine beams is to use a system of two antennas in MFPB (Multiple Feed Per Beam) configuration using a plurality of feeds per beam. Generally, the first antenna Tx operates in transmission mode, the second antenna Rx operates in reception mode, and for each antenna, each beam is formed by combining the signals from a plurality of adjacent individual feeds, some of these feeds being reused to generate contiguous beams. A satisfactory radiation efficiency is obtained by virtue of the reuse of the feeds which participate in the formation of a plurality of beams, which makes it possible to increase the radiative surface area allocated to each beam and to reduce the losses by spill-over. When the feeds are shared between a plurality of beams of the same frequency and of the same polarization, it is possible to create a condition of independence between the beams sharing radiating elements by imposing the formation of so-called orthogonal laws. The orthogonality is produced by using directional couplers which isolate in pairs the distribution circuits of a beam-forming network BFN which share the same radiating elements. However, the constraints of orthogonality cause a deformation of the radiating patterns of the antennas and an increase in the Ohmic losses of the recombination circuits linked to the complexity of the distribution circuits. The aggregate losses are often significant, that is to say of the order of 1 dB. Furthermore, it is necessary to limit the complexity of the beam formers to a rate of reuse of two radiating elements per spot. This leads to physically separating the circuits for combining two adjacent beams by a distance corresponding to two adjacent radiating elements. For spots that have an angular difference of between 0.2° and 0.3°, the apparent focal length may be very great, for example of the order of 10 metres. Finally, the reuse of the feeds during the creation of two adjacent beams presents major drawbacks linked to the bulk of the combination circuits, to the weight of the beam former and to the complexity of the formation of the amplitude and phase laws of each antenna. In practice, for a reuse of two feeds per polarization, the number of individual radiofrequency RF subsystems increases by a factor greater than four with the number of spots to be formed. Thus, for 100 spots, a number of radiofrequency RF subsystems greater than 400 radiation elements is required which necessitates a surface area in the focal plane of the order of 500 mm*500 mm. The weight and the volume of the beam former then become unmanageable.

SUMMARY OF THE INVENTION

The aim of the invention is to produce a novel multi-beam antenna in MFPB configuration comprising an array made up of compact feeds, the antenna not exhibiting the drawbacks of the existing antennas, making it possible to do away with the use of orthogonal BFNs for the generation of adjacent beams, and making it possible to obtain a large of contiguous fine beams having an angular coverage of between 0.2° and 0.4°, with a good overlap of the areas of coverage on the ground, called spots, corresponding to each beam.

For this, the invention relates to a multi-beam antenna with a plurality of feeds per beam comprising at least one reflector and one array of a plurality of feeds illuminating the reflector, the feeds being associated in a plurality of groups offset relative to one another in two directions X, Y of a plane placed at the focus of the reflector, each group comprising the same number of feeds. Each feed comprises a polarizer linked to a radiating element and two diplexers respectively incorporated into two output channels of the polarizer, each diplexer comprising two output ports, the four output ports of the two diplexers forming four ports of the feed, the four ports operating in four different colours, each colour being defined by a pair of frequency and polarization values. All the feeds belonging to the same group comprise first ports having the same first colour, or second ports having the same second colour, linked together to form a first beam and third ports having the same third colour, or fourth ports having the same fourth colour, linked together to form a second beam.

Advantageously, the groups are evenly spaced apart by a first pitch L1 in the direction X and by a second pitch L2 in the direction Y, the pitches L1 and L2 corresponding to one or more feeds, two adjacent groups in the direction X sharing at least one feed in common.

Advantageously, two adjacent groups in the direction Y share no feed in common.

Advantageously, the antenna comprises, for each group of feeds, distribution circuits linking all the feeds of the same group together, in the directions X and Y, the links being created between the first ports having the same first colour and between the third ports having the same third colour, or between the second ports having the same second colour and between the fourth ports having the same fourth colour.

Advantageously, each beam is formed by distribution circuits dedicated to this beam and independent of the distribution circuits dedicated to the formation of any other beam.

According to a particular embodiment, the feeds can be associated in groups of four adjacent feeds in the directions X and Y, and two consecutive groups can be spaced apart by a first pitch L1 corresponding to a feed in the direction X and by a second pitch L2 corresponding to two feeds in the direction Y. In this case, for each group of four adjacent feeds, the first ports, or the second ports, are linked in pairs in the direction X by a first level of distribution circuits then linked in pairs in the direction Y by a second level of distribution circuits and the third ports, or the fourth ports, are linked in pairs in the direction X by a first level of distribution circuits, then linked in pairs in the direction Y by a second level of distribution circuits.

Advantageously, two adjacent groups spaced apart by a first pitch L1 in the direction X can comprise two feeds in common, and in this case, for the first of the two adjacent groups, the first ports of the feeds of the first group, respectively the third ports of the feeds of the first group, are linked in fours in the directions X and Y and for the second of the two adjacent groups, the second ports of the feeds of the second group, respectively the fourth ports of the feeds of the second group, are linked in fours in the directions X and Y.

The invention also relates to a system of two multi-beam antennas with a plurality of feeds per beam, the first antenna operating in transmission mode and the second antenna operating in reception mode.

The invention finally relates to a satellite telecommunication system comprising at least such a multi-beam antenna with a plurality of feeds per beam.

BRIEF DESCRIPTION OF THE DRAWINGS

Other particular features and advantages of the invention will become clearly apparent hereinbelow from the description given as a purely illustrative and nonlimiting example, with reference to the appended schematic drawings which represent.

DETAILED DESCRIPTION

Figure 1:
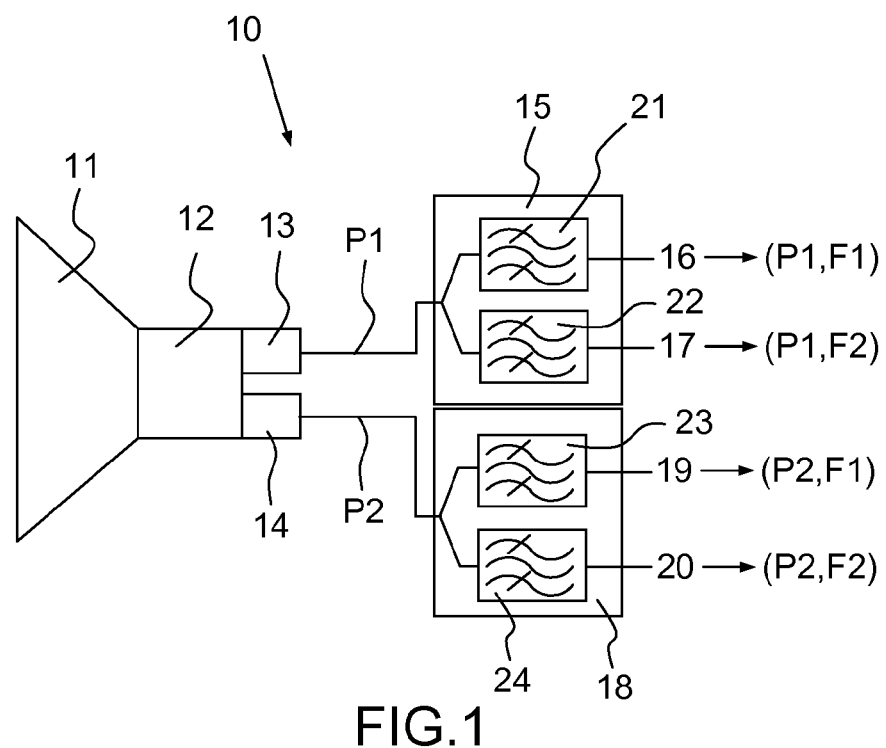
FIG. 1: a diagram in longitudinal cross section of an exemplary compact radiofrequency feed with four ports corresponding to four different colours, according to the invention.

FIG. 1 represents a diagram in longitudinal cross section of an exemplary compact radiofrequency feed with four ports corresponding to four different colours, according to the invention. The feed 10 is made up of a radiating element 11, for example of horn type, and of a radio frequency subsystem connected to the horn 11. The radiofrequency subsystem comprises a polarizer 12 connected to the horn 11 of the feed 10, the polarizer 12 having a first 13 and a second 14 output channel with mutually orthogonal polarizations P1, P2 and operating in the same frequency band DF. The polarizations P1, P2 can, for example, be linear or circular. The first output channel 13 of the polarizer 12 is connected to a first compact diplexer 15 mounted inside the first output channel 13 of the polarizer 12, the first diplexer 15 comprising two output ports 16, 17 of the same polarization and decoupled in frequency so as to operate in two different colours, a colour being defined by a pair of frequency and polarization values. Similarly, the second output channel 14 of the polarizer 12 is connected to a second compact diplexer 18 mounted inside the second output channel 14 of the polarizer 12, the second diplexer 18 comprising two output ports 19, 20 of the same polarization, orthogonal to that of the two output ports 16, 17 of the first diplexer, and decoupled in frequency so as to operate in two different colours. The two output ports 16, 17 of the first diplexer 15 and the two output ports 19, 20 of the second diplexer 18 form four ports of the radiofrequency feed 10 corresponding to four different colours. The four ports 16, 17, 19, 20 of the feed 10 are incorporated into a mesh corresponding to the diameter of the radiating horn 11. Advantageously, the first diplexer 15 comprises two band filters 21, 22 dividing the frequency band DF of the first output channel 13 of the polarizer 12 into two separate frequency subbands DF1, DF2, of the same width, and centred respectively on two different operating frequencies F1, F2. The two frequency bands DF1, DF2 are transmitted respectively on the two output ports 16, 17 of the first diplexer 15 which therefore operate in the two different frequencies F1, F2. The two frequency subbands DF1, DF2 are separated by a guard band DG so as to decouple, in frequency, the two output ports 16, 17 of the first diplexer 15. Consequently, the frequency band DF is equal to the sum of the bands DF1+DF2+DG.

Similarly, the second diplexer 18 comprises two band filters 23, 24 centred on the same operating frequencies F1 and F2 and filtering the same frequency bands DF1, DF2 as the two band filters 21, 22 of the first diplexer 15. The two frequency bands DF1, DF2 are transmitted respectively on the two output ports 19, 20 of the second diplexer 18 which therefore operate in the two different frequencies F1, F2 and are therefore decoupled in frequency. The two ports 16, 17 of the first diplexer 15 therefore operate in the polarization P1 and respectively in the frequencies F1 and F2 and the two ports 19, 20 of the second diplexer 18 operate in the polarization P2 and respectively in the frequencies F1 and F2. The four ports 16, 17, 19, 20 of the feed 10, therefore operate respectively in four different colours corresponding to the following four pairs of frequency and polarization values (F1, P1), F2, P1), F1, P2), (F2, P2) and are incorporated in a mesh corresponding to the diameter of a radiating element, for example of horn type. This compact feed used in an antenna makes it possible to do away with the constraints of orthogonality of the beam-forming laws by using independent distribution circuits dedicated to each colour and therefore to each beam.

Figure 2A:
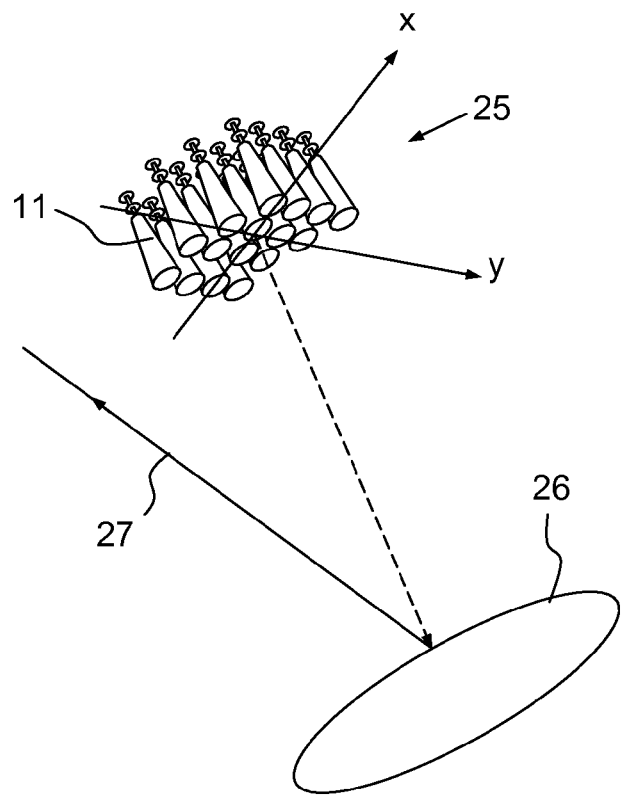
FIGS. 2a and 2b: two diagrams, respectively in perspective and in cross section, of an exemplary multi-beam antenna in MFPB configuration, according to the invention.
Figure 2B:
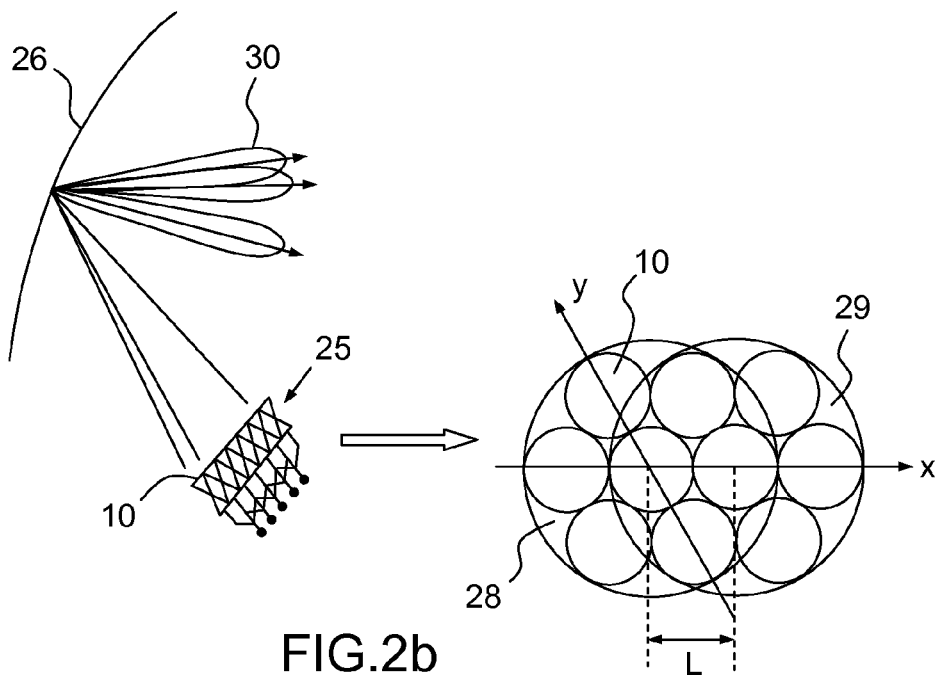

FIGS. 2a and 2b represent two diagrams respectively in perspective and in cross section, of an exemplary multi-beam antenna in MFPB configuration, according to the invention. Different optical configurations of the antenna are possible, for example Gregorian or Cassegrain or similar, and, notably, the antenna can comprise one or two reflectors associated with a radiating array. In FIGS. 2a and 2b, the antenna comprises a reflector 26 and a radiating array 25 placed in the focal plane of the reflector 26, the radiating array 25 comprising a plurality of radiofrequency feeds 10, for example of horn type 1, organized in two directions X and Y of a plane. Each radiofrequency feed is a compact feed with four ports of different colours as described in relation to FIG. 1. The antenna points in a pointing direction 27 towards a chosen area of coverage on the ground, for example a region, a country, a set of several countries, a continent, or another territory. The antenna can be dedicated either to the transmission of contiguous fine beams 30, or to the reception of contiguous fine beams 30, and makes it possible to ensure all of the desired coverage, in transmission or in reception, in two dimensions U, V of space. A single antenna, operating for example in transmission mode, makes it possible to ensure a complete coverage in the two dimensions U and V of space. To carry out the transmission and reception functions, it is necessary to use a system of two antennas in MFPB configuration, a first antenna operating in transmission mode and a second antenna operating in reception mode.

Figure 3:
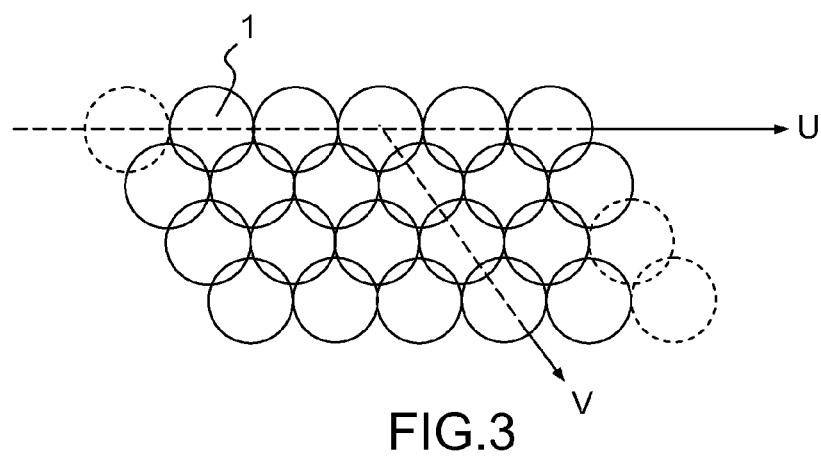
FIG. 3: a diagram of an exemplary coverage on the ground produced by a multi-beam antenna, according to the invention.
Figure 4A:
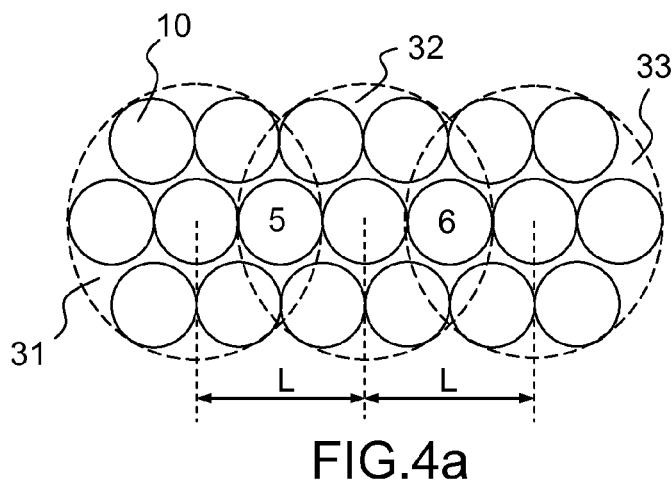
FIG. 4a: a diagram of an exemplary grouping of the feeds of the radiating array in groups of seven, each group participating in the generation of a beam, according to the invention.

As a nonlimiting example, FIG. 3 illustrates an exemplary coverage produced by the antenna, according to the invention. This figure shows that, in the directions U and V of space, the spots 1 produced on the ground by the antenna touch with a slight overlap between two adjacent spots 1 and do not exhibit any coverage hole. Each beam 30 transmitted or received by the antenna, corresponding to a spot 1 on the ground, is formed by the combination of the signals from a group of a plurality of adjacent feeds 10, for example four or seven adjacent feeds, arranged in a 2*2 matrix. Two adjacent consecutive groups share at least one feed in common and each feed therefore participates in the generation of a plurality of beams. In FIG. 2b, the feeds 10 are grouped in seven two adjacent groups 28, 29 being offset by a pitch L corresponding to a feed and share four feeds in common. FIG. 4a illustrates a second exemplary grouping of the feeds 10 of the radiating array in groups 31, 32, 33 of seven feeds 10, each group forming a beam, two adjacent groups 31, 32 being offset in the direction X by a pitch L corresponding to two feeds. The two adjacent consecutive groups 31, 32 share a feed 5 in common, the two adjacent consecutive groups 32, 33 share a feed 6 in common.

Figure 4B:
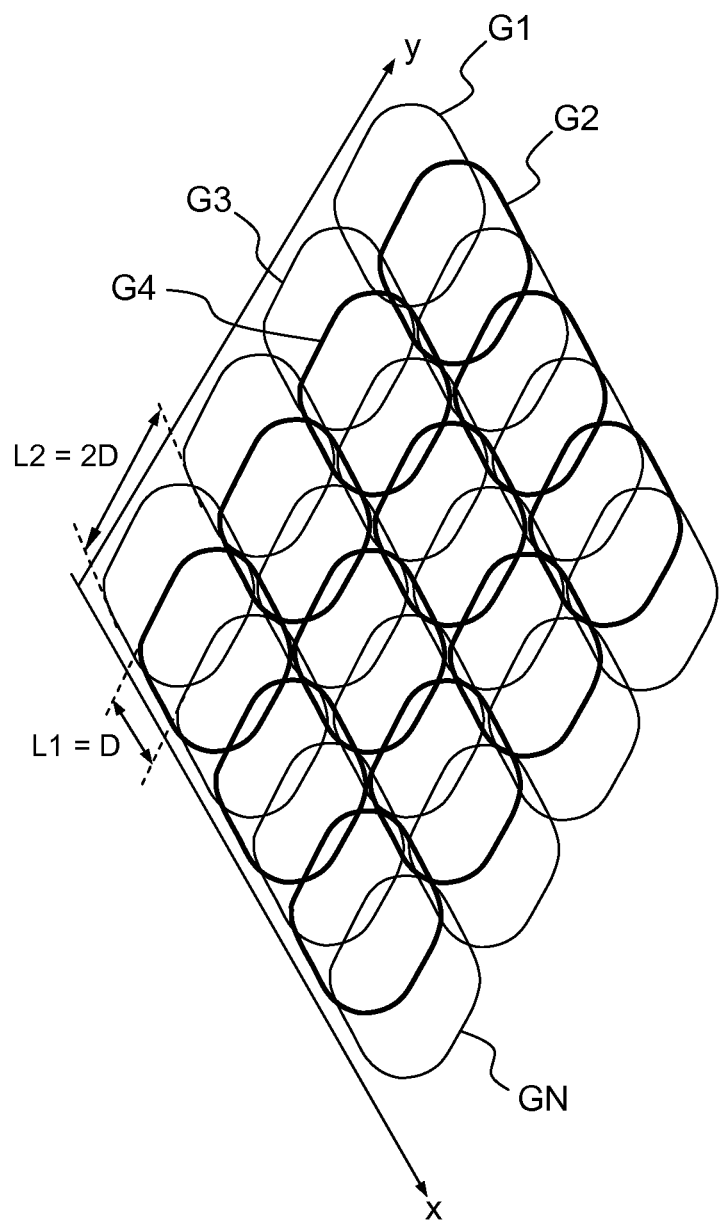
FIG. 4b: a diagram of an exemplary grouping of the feeds of the radiating array in groups of four, the feeds not being represented to simplify the diagram, each group participating in the generation of a beam, according to the invention.

FIG. 4b illustrates a third exemplary grouping of the feeds 10 in fours. Each group G1, G2, G3, G4, . . . , GN is made up of four feeds 10, not represented in FIG. 4b to simplify the diagram, the two adjacent groups G1, G2 being offset by a first pitch L1 corresponding to the bulk of a feed in the first direction X of the antenna and the two adjacent groups G1, G3 being offset by a second pitch L2 corresponding to the bulk of two feeds 10 in the second direction Y of the antenna. In the example of FIG. 4b, the pitch L1 is equal to the diameter D of a radiofrequency feed 10 and the pitch 2 is equal to the diameter 2D of two radiofrequency feeds. Thus, in the direction X, the two groups G1, G2 of four radiofrequency feeds which participate in the formation of adjacent beams share two feeds in common whereas, in the direction Y, the two groups G1, G3 of four radiofrequency beads which participate in the formation of adjacent beams do not comprise any feed in common. In this exemplary embodiment of the invention, the sharing of the radiofrequency feeds between two adjacent groups is therefore done only in a single direction X of the antenna. Other feed grouping modes are possible. Similarly, the number of feeds in sharing mode may differ in the directions X and Y.

Figure 5:
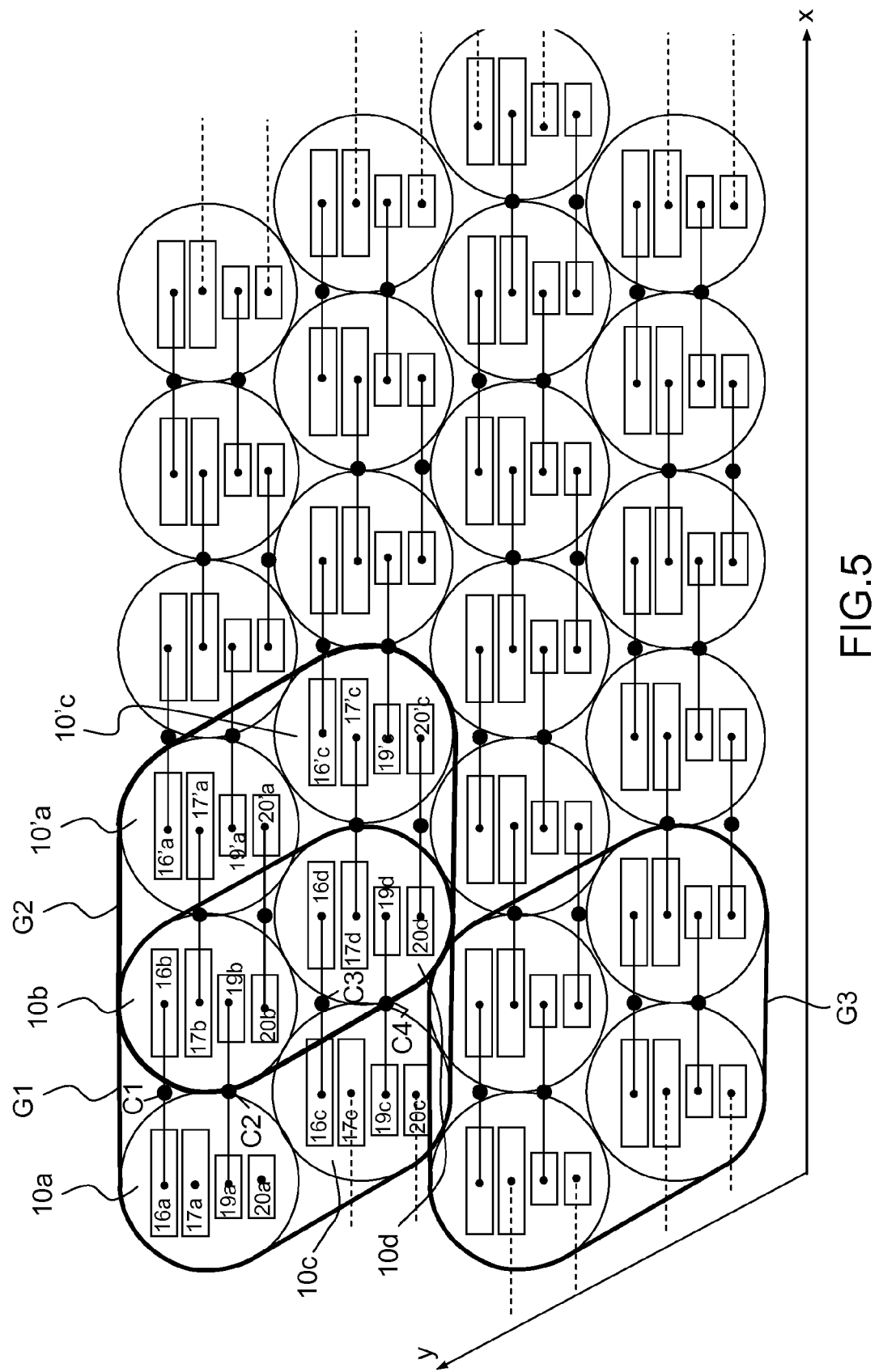
FIG. 5: a diagram illustrating a first level of combination of the ports of the feeds of an antenna, according to the invention.

The beams formed by the antenna are generated by a beam former comprising distribution circuits linking, for each group of feeds, the ports that have the same first colour, that is to say the same frequency and the same polarization, to form a first beam and the ports having the same third colour to form a second beam. Each group of feeds therefore participates in the formation of two different beams. Thus, for each group of radiofrequency feeds, the beam-forming device comprises distribution circuits C1 to C4, D1, D2, distributed on two levels, each beam being formed by dedicated distribution circuits. The distribution circuits dedicate to the formation of different beams are independent of the distribution circuits dedicated to the formation of any other beam. The distribution circuits of each level comprise only waveguides which operate either as signal combiners or as signal dividers depending on whether the antenna is a transmission antenna or a reception antenna. No coupler is needed. An example of first distribution level is represented in FIG. 5. In this example, the first distribution level comprises, for each group of four radiofrequency feeds, two first distribution circuits C1, 2 linking two adjacent radiofrequency feeds 10a, 10b in the direction X, and two first distribution circuits C3, C4 linking two adjacent radiofrequency feeds 10c, 10d in the direction X, therefore four first distribution circuits C1 to C4 in groups of four radiofrequency feeds 10a, 10b, 10c, 10d. The first distribution circuits C1, C2 link, in pairs and in the direction X, two first ports 16a, 16b and two third ports 19a, 19b, the two adjacent first and second feeds 10a, 10b of the same group G1 of four feeds. The two linked first ports 16a, 16b have the same polarization P1 and the same operating frequency F1, therefore the same colour, the two linked third ports 19a, 19b have the same polarization P2 and the same operating frequency F1, therefore the same colour. Similarly, the first distribution circuits C3, C4 link, in pairs and in the direction X, two first ports 16c, 16d and two third ports 19c, 19d of two third and fourth adjacent feeds 10c, 10d of the same group G1 of four feeds. The two linked first ports 16c, 16d have the same polarization P1 and the same operating frequency F1, therefore the same colour, the two linked third ports 19c, 19d have the same polarization P2 and the same operating frequency F1, and therefore the same colour.

Since each feed 10a to 10c comprises four ports, on completion of the combination carried out between the first ports 16a, 16b, respectively 19a, 19b, linked to two adjacent feeds 10a, 10b of the first group G1 of four feeds, the two feeds 10a, 10b each comprise a second port 17a, 17b and a fourth port 20a, 20b that are free which can in turn be respectively linked, in the direction X, to a second port and to a fourth port of an adjacent feed belonging to a second group G2 of four feeds offset from the first group G1 by a pitch L1 corresponding to a feed. For example, in FIG. 5, the four feeds of the second group G2 are the feeds 10b, 10'a, 10d, 10'c. The second and fourth ports 17b and 20b of the feed 10b are respectively linked with the second and fourth ports 17'a and 10'a of the feed 10'a and the second and fourth ports 17d and 20d of the feed 10d are respectively linked to the second and fourth ports 17'c and 20'c of the feed 10'c. The links between two respective ports of two adjacent feeds are created in the same manner for all the groups of four feeds as far as the edges of the radiating array. The feeds situated on the edge of the radiating array of the antenna have only a single adjacent feed and each comprise two ports 17a, 20a which remain free.

Figure 6:
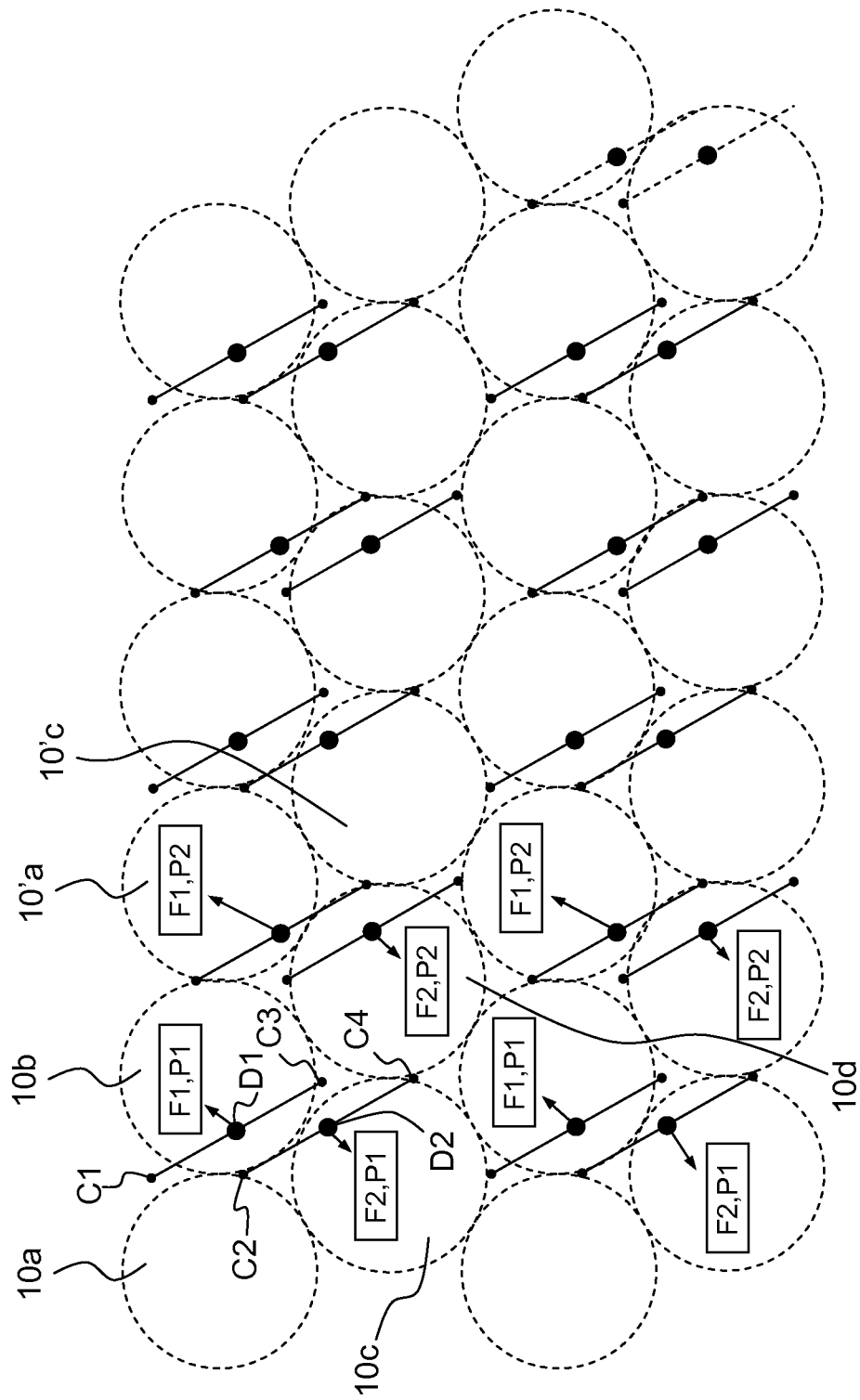
FIG. 6: a diagram illustrating a second level of combination of the ports of the feeds of an antenna, according to the invention.

An exemplary second distribution level is represented in FIG. 6. The second distribution level comprises second distribution circuits D1, D2 which link respectively, in pairs and in the direction Y, for each group G1 of four radiofrequency feeds 10a, 10b, 10c, 10d, on the one hand, the two first ports 16a, 16b of the first and second feeds 10a, 10b linked in the direction X with the two first ports 16c, 16d of the third and fourth radiofrequency feeds linked in the direction X and, on the other hand, the two third ports 19a, 19b of the first and second radiofrequency feeds 10a, 10b linked in the direction X with the two third ports 19c, 19d of the third and fourth radiofrequency feeds 10c, 10d linked in the direction X. The output of the distributor D1 is a port forming a spot of frequency F1 and of polarization P1 and the output of the distributor D2 is a port forming a spot of frequency F1 and of polarization P2. Similarly, for each group of four feeds, all the ports of the same frequency and of the same polarization linked in pairs by the first distributors of the first distribution level are linked together by a distributor of the second level so as to generate all the spots of the antenna.

This antenna configuration makes it possible to link together, in two different ways, the feeds of the same group, to thus produce two adjacent beams in two different colours for each group of feeds and therefore double the number of beams produced by the same antenna. This makes it possible to obtain, with a single antenna, a good overlap of the corresponding spots produced on the ground. Furthermore, the formation of each beam is done simply by dedicated distribution circuits, independent of the distribution circuits used for the formation of the other beams.

A complete coverage in transmission and reception modes is obtained by using a system of two antennas of the same dimensions, the first antenna operating in transmission mode and the second antenna operating in reception mode.

Although the invention has been described in relation to particular embodiments, it is clearly obvious that it is in no way limited thereto and that it encompasses all the technical equivalents of the means described as well as combinations thereof provided that they fall within the framework of the invention. In particular, the number of feeds per beam and the number of feeds shared between two adjacent beams may differ from what is explicitly described in the exemplary embodiments.

The invention claimed is:

1. A multi-beam antenna with a plurality of feeds per beam comprising at least one reflector and one array of a plurality of feeds illuminating the reflector, the feeds being associated in a plurality of groups offset relative to one another in two directions X, Y of a plane placed at the focus of the reflector, each group comprising the same number of feeds, wherein each feed comprises a polarizer linked to a radiating element and two diplexers respectively incorporated into two output channels of the polarizer, each diplexer comprising two output ports, the two output ports of the two diplexers forming four ports of the feed, the four ports operating in four different colours, each colour being defined by a pair of frequency and polarization values, and wherein, all the feeds belonging to the same group comprise first ports having a same first colour, or second ports having a same second colour, linked together to form a first beam and third ports having a same third colour, or fourth ports having a same fourth colour, linked together to form a second beam.

2. The multi-beam antenna of claim 1, wherein the groups are evenly spaced by a first pitch L1 in the direction X and by a second pitch L2 in the direction Y, the pitches L1 and L2 corresponding to one or more feeds, two adjacent groups in the direction X sharing at least one feed in common.

3. The multi-beam antenna of claim 2, wherein two adjacent groups in the direction Y share no feed in common.

4. The multi-beam antenna of claim 1, comprising, for each group of feeds, distribution circuits linking all the feeds of the same group together, in the directions X and Y, the links being created between the first ports having the same first colour and between the third ports having the same third colour, or between the second ports having the same second colour and between the fourth ports having the same fourth colour.

5. The multi-beam antenna of claim 4, wherein each beam is formed by distribution circuits dedicated to this beam and independent of the distribution circuits dedicated to the formation of any other beam.

6. The multi-beam antenna of claim 3, wherein:
the feeds are associated in groups of four adjacent feeds in the directions X and Y, two consecutive groups being spaced apart by a first pitch L1 corresponding to a feed in the direction X and by a second pitch L2 corresponding to two feeds in the direction Y,
for each group of four adjacent feeds, the first ports, or the second ports, are linked in pairs in the direction X by a first level of distribution circuits then linked in pairs in the direction Y by a second level of distribution circuits and the third ports, or the fourth ports, are linked in pairs in the direction X by a first level of distribution circuits, then linked in pairs in the direction Y by a second level of distribution circuits.

7. The multi-beam antenna of claim 6, wherein two adjacent groups spaced apart by the first pitch L1 in the direction X comprise two feeds in common, wherein, for the first of the two adjacent groups, the first ports of the feeds of the first group, respectively the third ports of the feeds of the first group, are linked in the directions X and Y and wherein, for the second of the two adjacent groups, the second ports of the feeds of the second group, respectively the fourth ports of the feeds of the second group, are linked in fours in the directions X and Y.

8. The multi-beam transmission and reception antenna system, comprising a first multi-beam antenna and a second multi-beam antenna according to claim 1, the first antenna operating in transmission mode and the second antenna operating in reception mode.

9. A satellite telecommunication system, comprising at least one multi-beam antenna according to claim 1.

* * * * *